US007499186B2

(12) United States Patent
Waisanen

(10) Patent No.: US 7,499,186 B2
(45) Date of Patent: Mar. 3, 2009

(54) LASER SURVEY DEVICE

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 0 days.

(21) Appl. No.: 10/722,004

(22) Filed: Nov. 25, 2003

(65) Prior Publication Data

US 2005/0111012 A1 May 26, 2005

(51) Int. Cl.
*G01B 11/24* (2006.01)

(52) U.S. Cl. .......................... 356/622; 356/400; 33/287

(58) Field of Classification Search ................. 356/601, 356/614, 622, 399–401; 33/287
See application file for complete search history.

(56) References Cited

U.S. PATENT DOCUMENTS 3,545,384 A * 12/1970 Plasser et al. ................ 104/7.2
3,750,299 A * 8/1973 Plasser et al. ................. 33/287
4,535,699 A * 8/1985 Buhler ........................ 33/287
4,817,293 A 4/1989 Daverio et al.
4,904,081 A * 2/1990 Miyahara ................. 356/141.3
5,153,844 A * 10/1992 Beni et al. .................. 702/167
5,157,840 A 10/1992 Henttinen
5,613,442 A 3/1997 Ahola et al.
5,671,540 A 9/1997 Davis
6,314,650 B1 * 11/2001 Falb ............................ 33/286
6,415,208 B1 7/2002 Pojda

FOREIGN PATENT DOCUMENTS

JP 2259413 10/1990

* cited by examiner

*Primary Examiner*—Hoa Q Pham
(74) *Attorney, Agent, or Firm*—Porter, Wright, Morris & Arthur, LLP

(57) ABSTRACT

A remotely operated laser survey device for performing a runway survey on a rail system that supports a device such as an overhead crane. The survey device includes a laser assembly and a survey car. The laser assembly can include a self-leveling laser. The survey car includes an image acquisition device and can be self-propelled by a drive mechanism. Images obtained using the image acquisition device are transmitted to a remote computer for analysis. The analysis can include a centroidal analysis of the image. Deviation of the rails is compared to established standards and correction carried out if necessary. The image acquisition device can be triggered to obtain images based on movement of the survey car. The survey car can be centered on a rail of the rail system to ensure accurate results regardless of the condition of the rail.

15 Claims, 11 Drawing Sheets

LASER SURVEY DEVICE

BACKGROUND OF THE INVENTION

The invention relates to overhead cranes, and more particularly to runway surveys of rail systems that are adapted to support overhead cranes.

Rail systems are surveyed periodically to ensure the rails are within established guidelines (e.g., guidelines established by Crane Manufacturers Association of America ("CMAA")). Data generated during the survey is utilized to correct the positioning of the rails if deviation exists. Most railway surveys are accomplished manually using either a transit or a laser. A target is moved longitudinally along the rail to predetermined positions and measurements are taken. Manual railway surveys introduce human error, take excessive amounts of time, and expose the surveyor to dangerous working conditions.

SUMMARY OF THE INVENTION

The invention provides a remotely operated laser survey device. The survey device can complete a runway survey in a fraction of the time required to complete a manual runway survey. The survey device also produces results that are more accurate than previous survey techniques.

In one embodiment, the invention provides a method of performing a runway survey on a rail system. The rail system is utilized to support a device such as an overhead crane. The method includes mounting a self-leveling laser on the rail system. The self-leveling laser includes a level sensor positioned to determine a level condition of the laser. The level sensor generates a signal representative of the level condition of the laser. The method also includes adjusting a level position of the laser using the signal generated by the level sensor, supporting a survey car that includes an image acquisition device on the rail system for movement relative to the laser, projecting a laser spot on the image acquisition device by emitting a laser beam from the laser when the laser is substantially level, and capturing an image of the laser spot using the image acquisition device.

In another embodiment, the invention provides a laser survey device for performing a runway survey on a rail system. The rail system is utilized to support a device such as an overhead crane. The laser survey device includes a laser mounted on a rail of the rail system and a self-propelled survey car supported on the rail for movement relative to the laser. The self-propelled survey car includes an image acquisition device and a drive mechanism to move the survey car along the rail relative to the laser. The laser emits a laser beam that projects a laser spot on the image acquisition device. The image acquisition device captures an image of the laser spot.

In yet another embodiment, the invention provides a method of performing a runway survey on a rail system. The rail system is utilized to support a device such as an overhead crane. The method includes mounting a laser on the rail system, supporting a survey car on the rail system for movement relative to the laser, and emitting a laser beam from the laser. The survey car includes a screen and an image capturing device positioned to obtain an image of the screen. The laser projects a laser spot on the screen. The method also includes capturing an image of the screen that includes an image of the laser spot using the image capturing device, and determining a centroid of the image of the screen. The centroid includes an X dimension and a Y dimension.

Further objects of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The present invention is further described with reference to the accompanying drawings, which show an embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" are used broadly and encompass both direct and indirect mountings, connections, supports, and couplings. Further, "connected" and "coupled" are not restricted to physical or mechanical connections or couplings.

DETAILED DESCRIPTION

Figure 1:
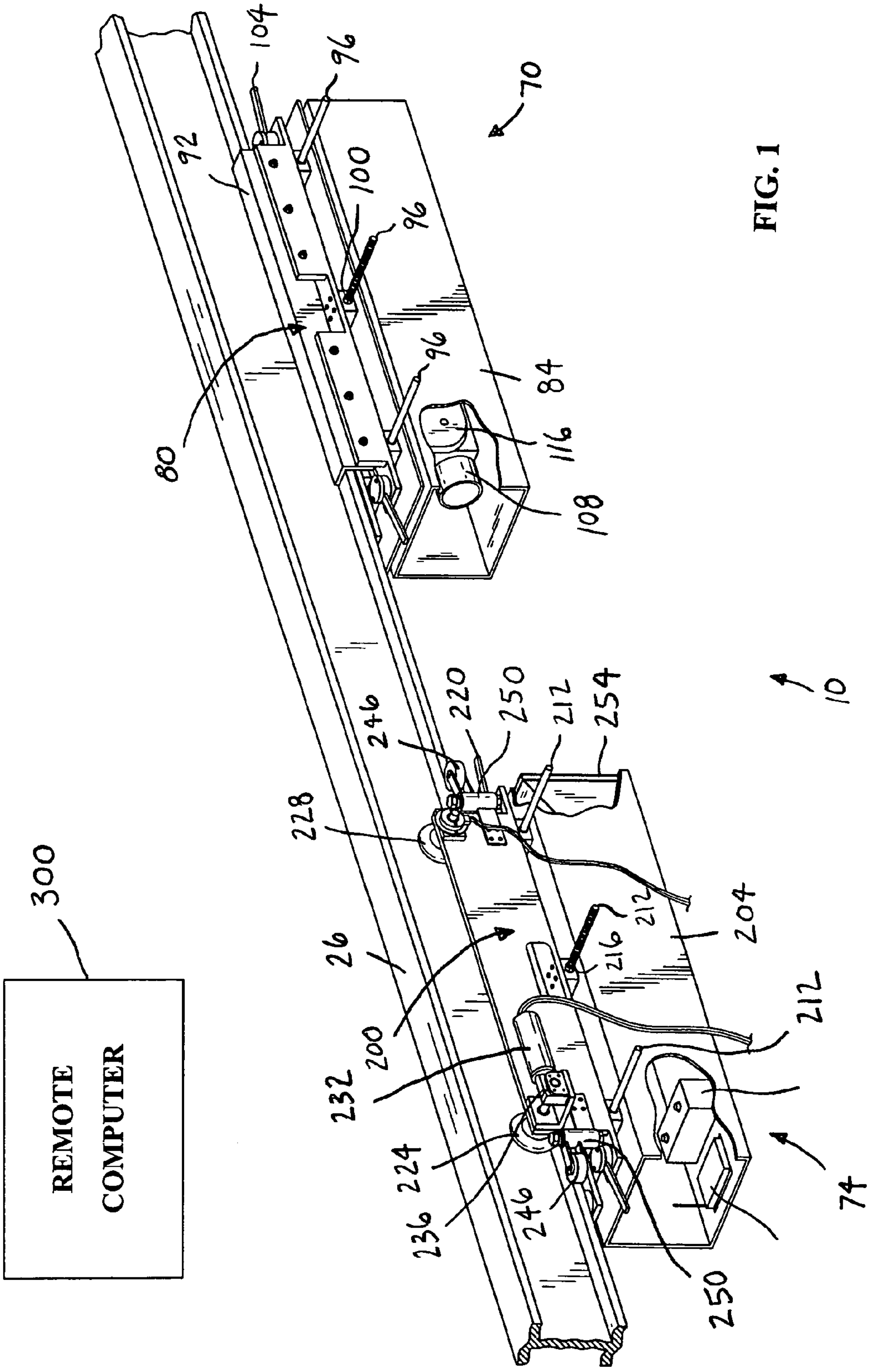
FIG. 1 illustrates a partially cut-away perspective view of a laser survey device according to one embodiment of the invention.
Figure 3:
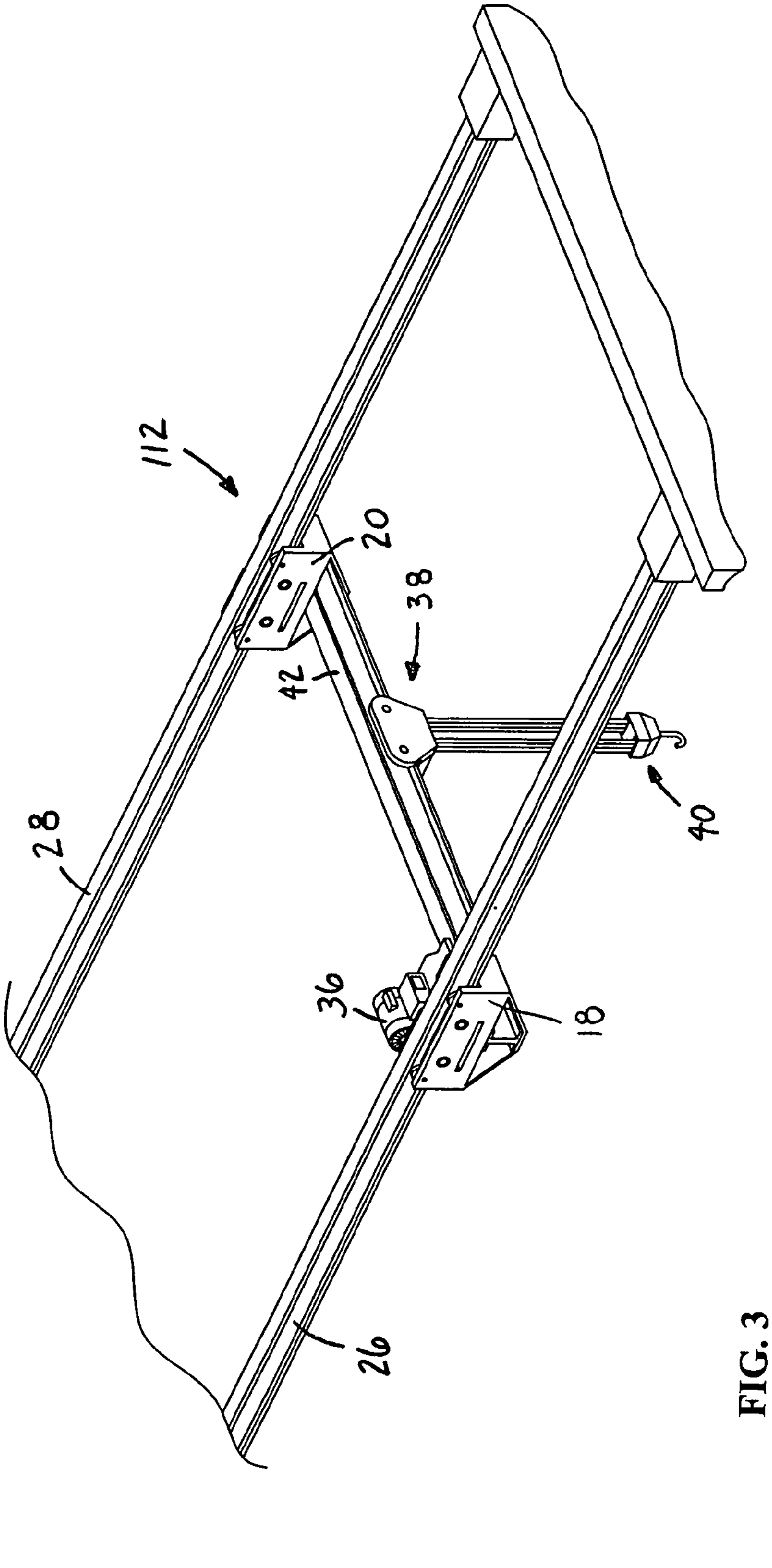
FIG. 3 schematically illustrates a bottom-running overhead crane supported on a rail system.

FIG. 1 illustrates a laser survey device 10 according to one embodiment of the invention. The survey device 10 is illustrated and described as being utilized to perform runway surveys while supported on a rail system or runway of a bottom-running overhead crane 112 (FIG. 3). It should be understood that the survey device 10 of the present invention is capable of use in performing runway surveys while supported on other rail systems (e.g., rail systems of top-running overhead cranes, rail systems of other types of overhead cranes, rail systems of other devices, and the like), and that the rail system of the overhead crane 112 is merely shown and described as one such example.

Figure 2:
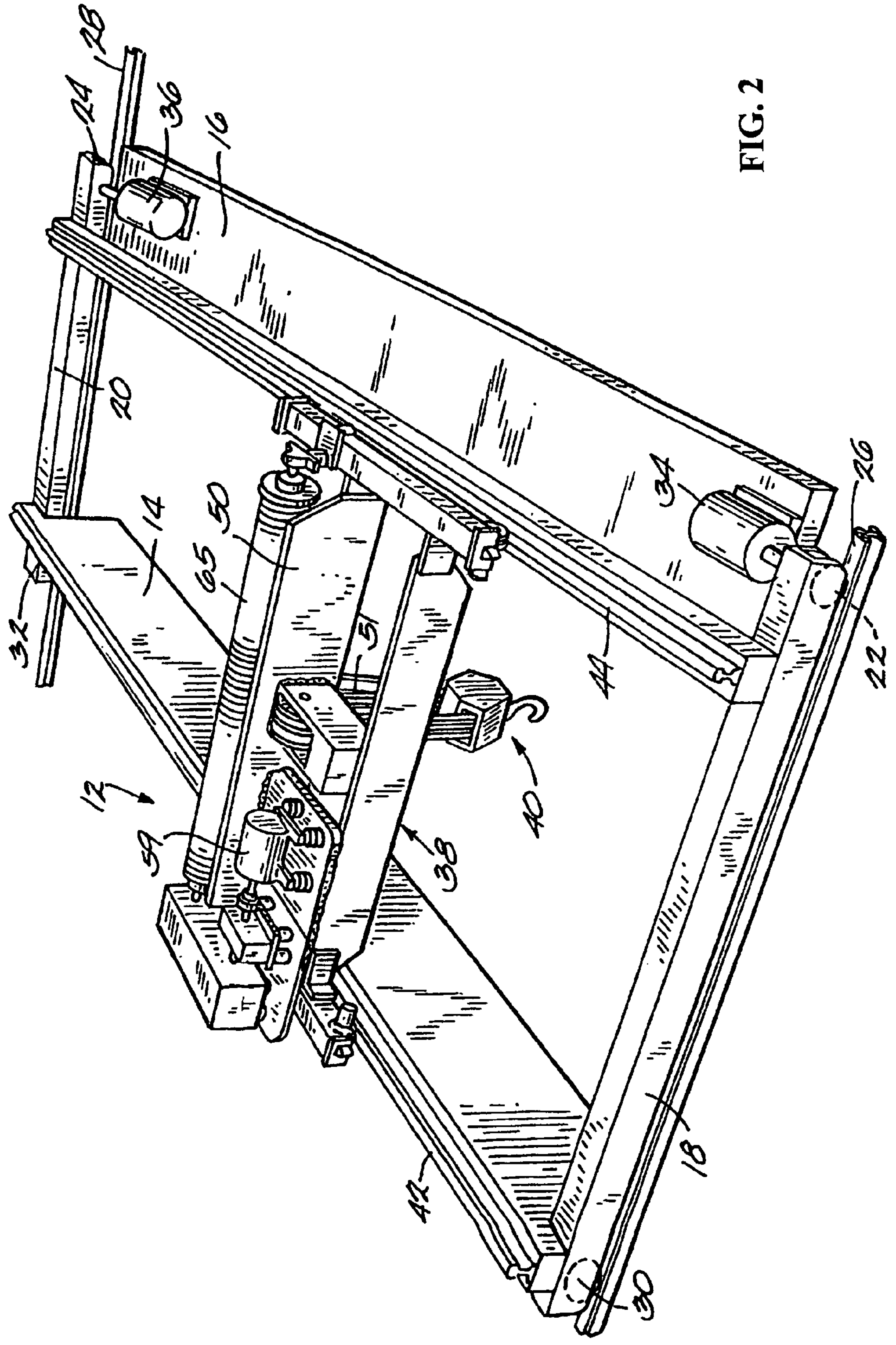
FIG. 2 illustrates a top-running overhead crane supported on a rail system.

FIG. 2 illustrates a top running overhead crane 12 supported on a rail system. Although the survey device 10 is primarily described herein with respect to the rail system of the bottom-running crane 112, FIG. 2 is provided to illustrate the general construction of overhead cranes and rail systems that support overhead cranes. The illustrated survey device 10 can be modified to perform runway surveys while supported on other rail systems, such as the rail system of the crane 12.

The crane 12 includes a pair of bridge cross-members 14, 16 and trucks 18, 20 at opposite ends of the cross-members 14, 16. Drive wheels 22, 24 are respectively rotatably mounted on the trucks 18, 20 in engagement with rails 26, 28 of the rail system so that the rails 26, 28 support the crane 12. Additional non-driven or idler wheels 30, 32 are respectively rotatably mounted on the trucks 18, 20 in engagement with the rails 26, 28 for further support of the crane 12. The rails 26, 28 extend in each direction and are mounted on conventional beams or other suitable foundation means. Engagement of the drive and idler wheels 22, 24, 30, 32 with the rails 26, 28 permits travel of the crane 12 along the rails 26, 28. Motors 34, 36 are mounted on the bridge cross-member 16 and drive the wheels 22, 24, respectively.

The crane 12 also includes a hoist apparatus 38. The hoist apparatus 38 includes a trolley or frame 50 that is supported for travel on tracks 42, 44 by wheel assemblies. The tracks 42, 44 are mounted on the cross-members 14, 16. The hoist apparatus 38 also includes a hoist drum 65 mounted on the frame 50 for rotation about a drum axis. A hoist rope 51 is wound around the drum 65 such that the rope 51 winds on to and off of the drum 65 in response to rotation of the drum 65 in opposite wind-on and wind-off directions, respectively.

The hoist apparatus 38 also includes a load engaging mechanism 40 connected to the rope 51. The load engaging mechanism 40 includes a bottom block through which the rope 51 is reeved, and a hook depending from the bottom block. As is known in the art, the load engaging mechanism 40 moves upward when the rope 51 winds on to the drum 65, and moves downward when the rope 51 winds off of the drum 65. The hoist apparatus 38 also include a motor 59 that is mounted on the frame 50. The motor 59 is connected to the drum 65 for selectively rotating the drum 65 in the opposite wind-on and wind-off directions.

FIG. 3 schematically illustrates the bottom-running overhead crane 112 supported on a rail system. Similar components of the cranes 12 and 112 are indicated using like reference numerals in the drawings. Although the rail systems utilized to support the cranes 12 and 112 are not identical, each rail system includes a first rail 26 and a second rail 28. The first and second rails 26 and 28 are spaced apart, and generally parallel. The cranes 12 and 112 as thus far described are conventional and need not be described in greater detail.

Engagement of the drive and idler wheels with the rails 26, 28 supports the crane 112 and permits travel of the crane 112 along the rail system. If the rails 26, 28 are not properly aligned, the crane 112 may not operate properly. Accordingly, rail systems are surveyed periodically (e.g., during installation of the rail system, after established periods of use, when the crane is experience bridge tracking problems, and the like) to ensure the rails 26,28 are within established guidelines (e.g., guidelines established by CMAA).

Figure 4:
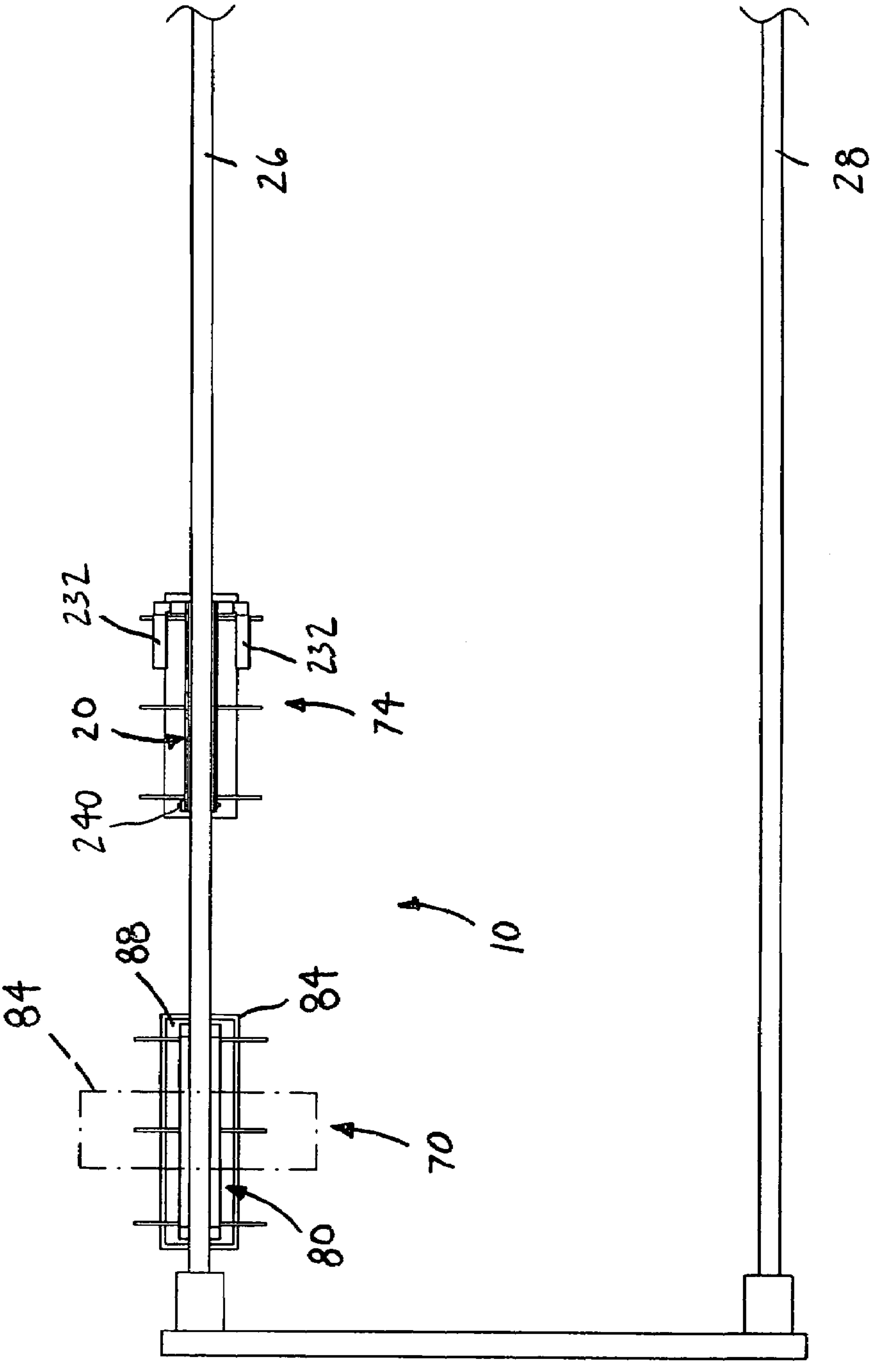
FIG. 4 illustrates a partial top view of the laser survey device of FIG. 1 supported on a rail system.

With reference to FIGS. 1 and 4, the survey device 10 is temporarily attached to the rail system of the crane 112 for performance of a railway survey. The survey device 10 includes a stationary component or laser assembly 70 and a movable component or survey car 74.

Figure 5:
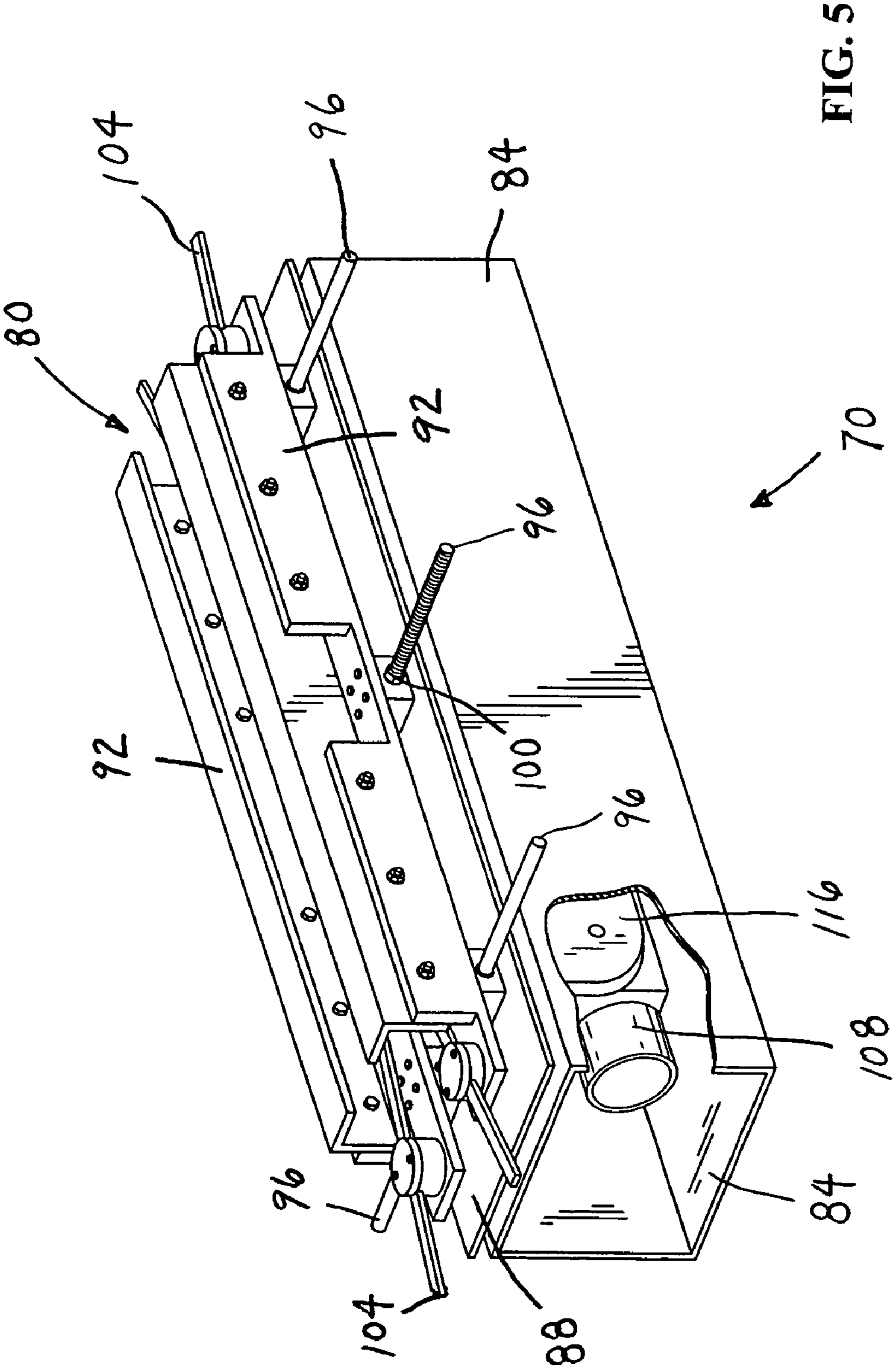
FIG. 5 illustrates a partially cut-away perspective view of a laser assembly of the laser survey device of FIG. 1.
Figure 7:
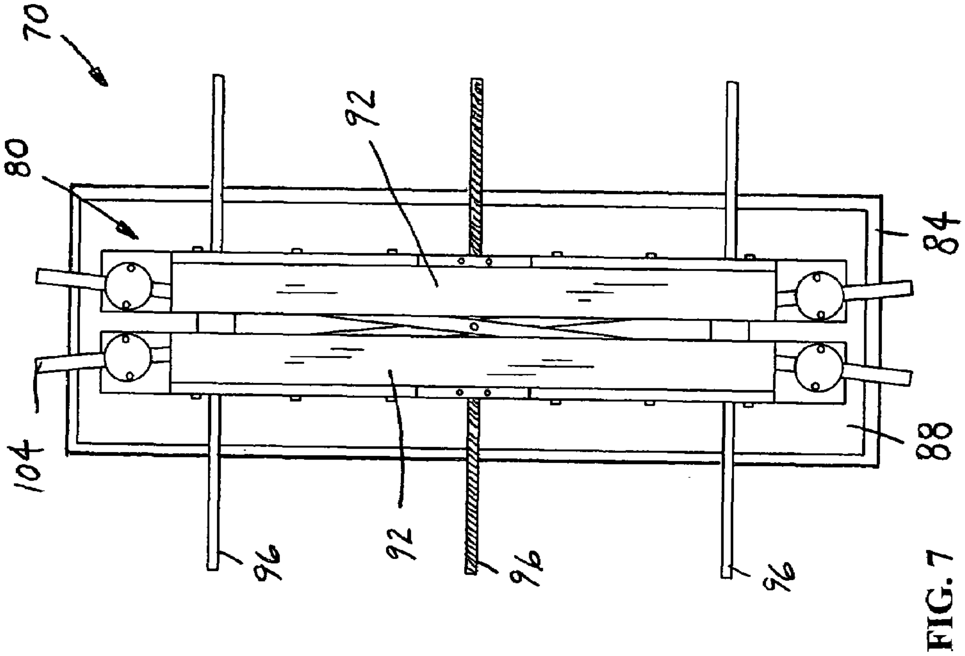
FIG. 7 is a view similar to FIG. 6 showing the mounting structure of the laser assembly in a closed position.
Figure 6:
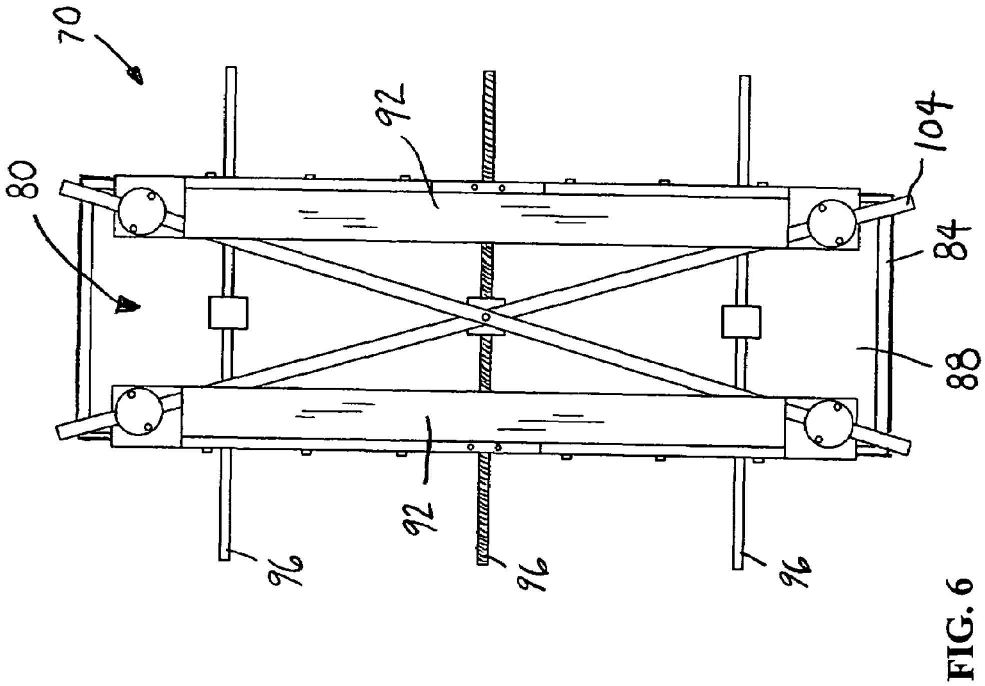
FIG. 6 illustrates a partial top view of the laser assembly of FIG. 5 with the mounting structure of the laser assembly in an open position.

With reference to FIG. 5, the laser assembly 70 includes a mounting structure 80 and a housing 84 supported by the mounting structure 80. The illustrated housing 84 is rotatably mounted to the mounting structure 80 for movement between an aligned position (solid lines in FIG. 4), where the housing 84 is aligned with the mounting structure 80, and a perpendicular position (phantom lines in FIG. 4), where the housing 84 is rotated ninety degrees relative to the mounting structure 80. The mounting structure 80 includes a base plate 88 and brackets 92 that are movable relative the base plate 88 between an open position (FIG. 6) and a closed position (FIG. 7). The brackets 92 are supported for movement on rod members 96. The rod members 96 are secured to the base plate 88. Nuts 100 are connected to a threaded rod member 96 to prevent outward movement of the brackets 92 relative to the base plate 88. Movement between the open and closed positions is facilitated by a scissors arrangement 104. With reference to FIG. 1, an L-shaped portion of each bracket 92 engages a lower flange of the rail 26 to support the laser assembly 70 on the rail system.

Figure 8:
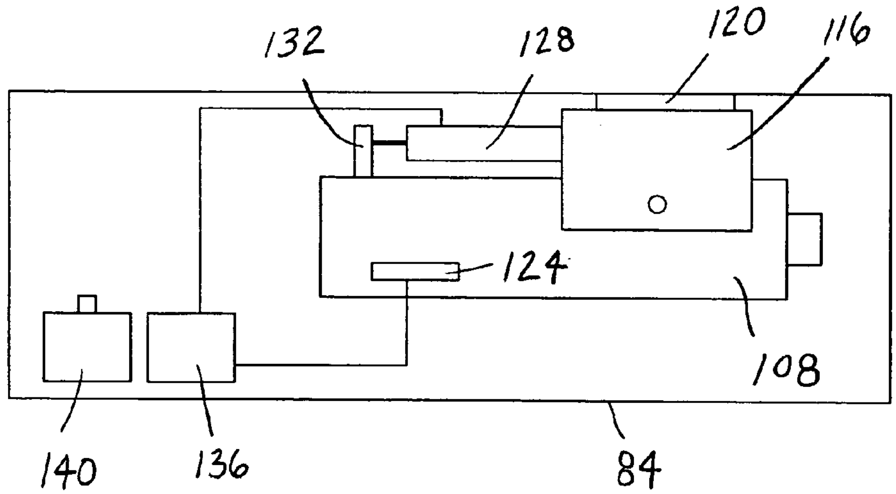
FIG. 8 is a schematic view of a self-leveling laser of the laser assembly of FIG. 5.

A laser 108 is positioned inside the housing 84. In the illustrated embodiment, the laser 108 is a 5 mW maximum at 632.8 nm laser (e.g., a Melles Griot model number 25-LHR-121-249 laser). In other embodiments, the power and/or wavelength of the laser 108 may be altered. The illustrated laser 108 is a self-leveling laser 108. FIG. 8 schematically illustrates the self-leveling laser 108. The laser 108 is mounted on a bracket 116 that is connected to the housing 84. The bracket 116 is pivotally connected to the housing 84 by a bearing 120. Pivotal movement of the bracket 116 relative to the housing 84 allows for longitudinal alignment of a laser beam emitted by the laser 108 along the rail 26, 28. A level sensor 124 is connected to the laser 108. In one embodiment, the level sensor 124 includes an electrolytic tilt sensor (e.g., a Fredericks Company model number 0719-1138-99 sensor) and a signal conditioning board (e.g., a Fredericks Company model number 1-6200-002 board). In other embodiments, other types of sensors may be utilized. The level sensor 124 generates a signal that is representative of a level condition of the laser 108. In one embodiment, a zero volt signal is representative of an in-level condition and a positive or negative volt signal is representative of an out-of-level condition. In one embodiment, each 3 mV change represents an arc second the laser 108 is out-of-level. In other embodiments, the sensor 124 may generate alternative signals.

The level sensor signal is utilized to control a motor 128 (e.g., a DC stepper motor or speed reducer) which drives a cam 132 to pivot the laser 108 relative to the bracket 116. Pivoting the laser 108 relative to the bracket 116 allows for adjustment of the level position of the laser 108 from an out-of-level position to an in-level position. A biasing member (e.g., a spring) may be utilized to bias the laser 108 against the cam 132. A control circuit 136 receives the level sensor signal and provides control to the motor 128. In the illustrated embodiment, the control circuit 136 is an analog control circuit. In other embodiments, the control circuit 136 may be alternatively configured (e.g., a digital control circuit). A power supply 140 positioned in the housing 84 provides power to the laser 108, the motor 128, the level sensor 124, and the control circuit 136. A switch configured to interrupt the provision of power may be actuated remotely (e.g., from a remote computer 300 (FIG. 1)) or locally. In the illustrated embodiment, a self-leveling routine is executed when power is provided and the laser 108 is in an out-of-level position. In other embodiments, the laser 108 may be manually leveled or otherwise adjusted.

Figure 9:
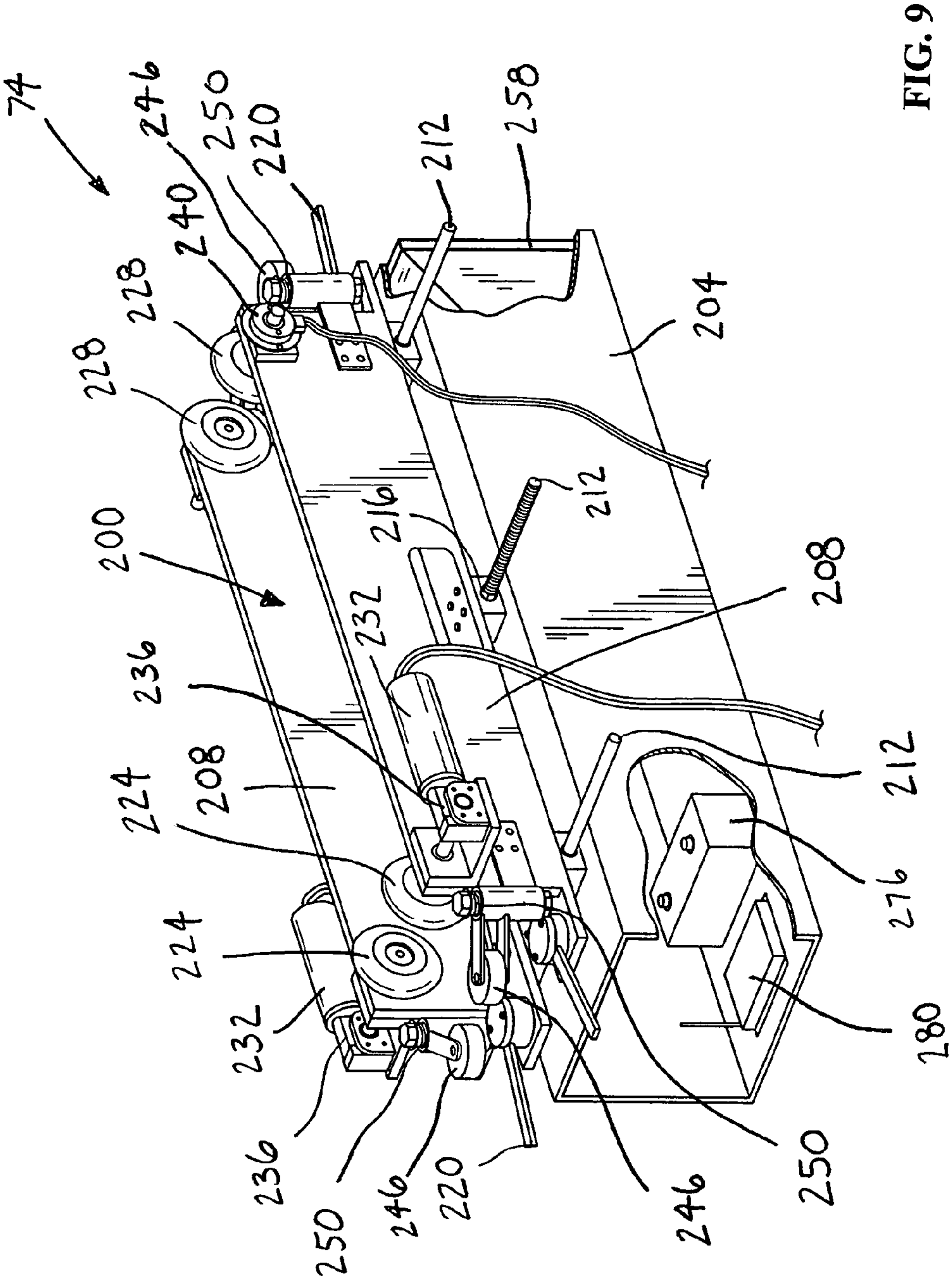
FIG. 9 illustrates a partially cut-away perspective view of a survey car of the laser survey device of FIG. 1.
Figure 11:
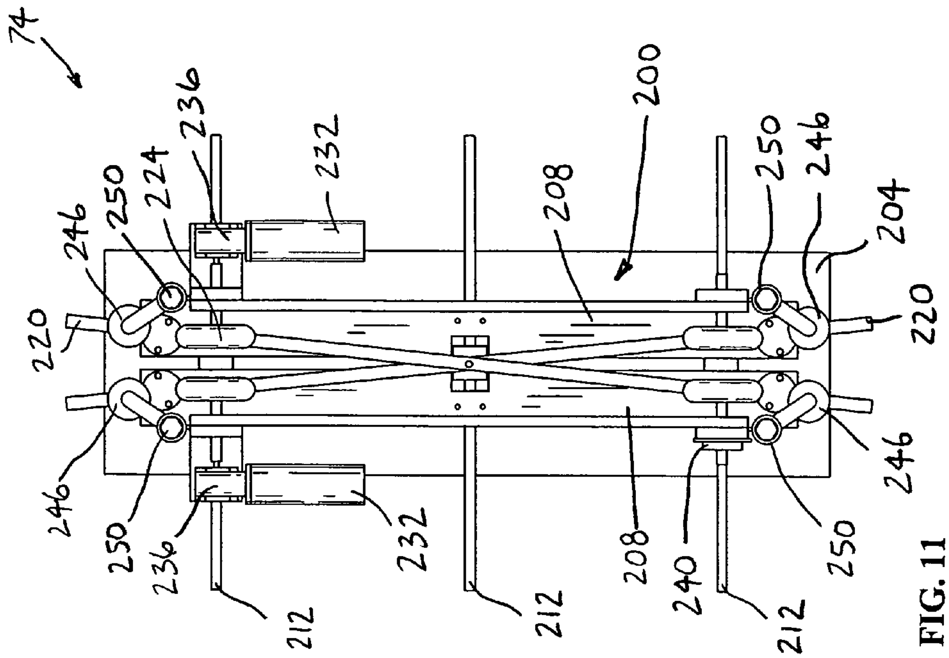
FIG. 11 is a view similar to FIG. 10 showing the mounting structure of the survey car in a closed position.

With reference to FIG. 9, the survey car 74 includes a mounting structure 200 and a housing 204 supported by the mounting structure 200. The mounting structure 200 includes brackets 208 that are movable relative the housing 204 between an open position (FIG. 10) and a closed position (FIG. 11). The brackets 208 are supported for movement on rod members 212. The rod members 212 are secured to the housing 204. Nuts 216 are connected to a threaded rod member 212 to prevent outward movement of the brackets 208 relative to the housing 204. Movement between the open and closed positions is facilitated by a scissors arrangement 220.

The mounting structure 200 also includes drive wheels 224 rotatably mounted on the brackets 208 for engagement with the rail 26, 28. Additional non-driven or idler wheels 228 are also mounted on the brackets 208 for engagement with the rail 26, 28. With reference to FIG. 1, engagement of the drive and idler wheels 224, 228 with the rail 26, 28 permits self-propelled travel of the survey car 74 along the rail 26, 28. Motors 232 mounted on the brackets 208 drive the wheels 224 through worm gear assemblies 236 (e.g., a 30:1 ratio worm gear assembly). In one embodiment, the motors are 12 volt DC motors (e.g., Engel GNM model number 2145-31.3 motors). In other embodiments, other drive mechanisms may be utilized to propel the survey car 74 along the rail 26, 28.

An encoder 240 (e.g., a 1024 pulses/revolution encoder) is attached to the shaft of one of the idler wheels 228. As the survey car 74 is propelled down the rail 26, 28, the encoder 240 generates a signal that is representative of the distance traveled by the survey car 74 relative to the laser 108.

Figure 10:
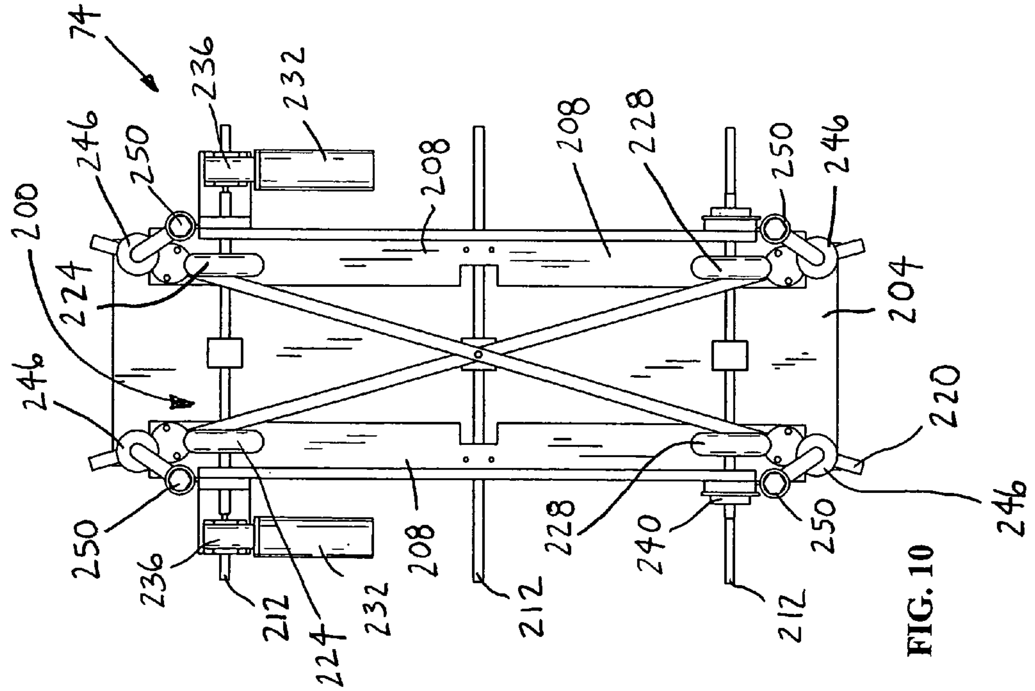
FIG. 10 illustrates a partial top view of the survey car of FIG. 9 with the mounting structure of the survey car in an open position.
Figure 13:
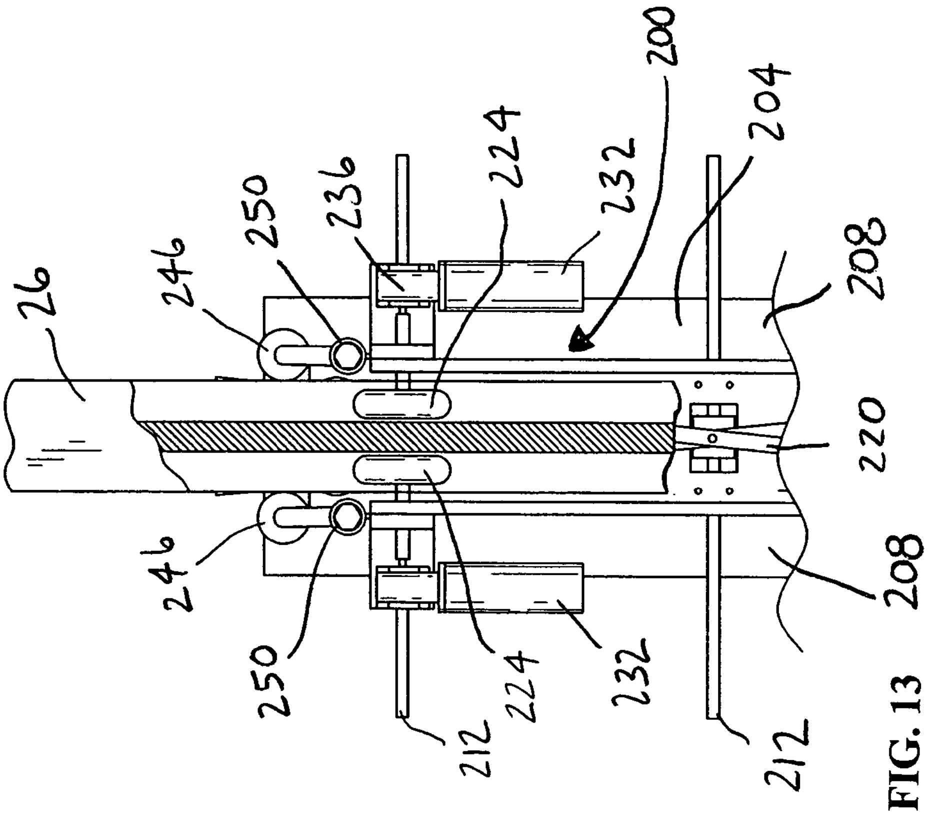
FIG. 13 is a view similar to FIG. 12 showing the mounting structure of the survey car supported on the rail.
Figure 12:
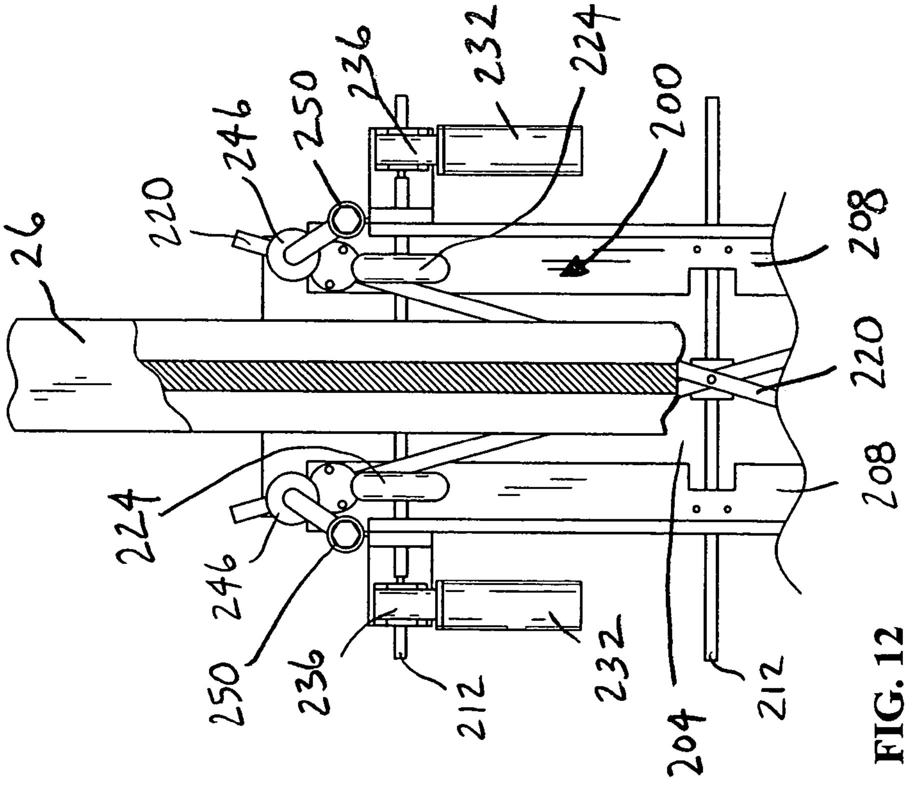
FIG. 12 illustrates a partial top view of the survey car of FIG. 9 adjacent a rail system showing the mounting structure of the survey car in an open position.

The mounting structure also includes self-adjusting guide rollers 246. As best shown in FIG. 10 and 11, the guide rollers 246 are biased inward by bias member 250 (e.g., torsion springs). The guide rollers 246 center the survey car 74 on the rail 26, 28. Use of a guide roller 246 on each side of the rail 26, 28 ensures the survey car 74 remains centered on the rail 26, 28 regardless of the condition of the rail 26, 28 (e.g., a worn rail head, a horizontally displaced rail, and the like). In the illustrated embodiment, each guide roller 246 is biased against a respective side portion of the lower flange of the rail 26, 28. In other embodiments, the guide rollers 246 may be positioned against other portions of the rail 26, 28.

Figure 14:
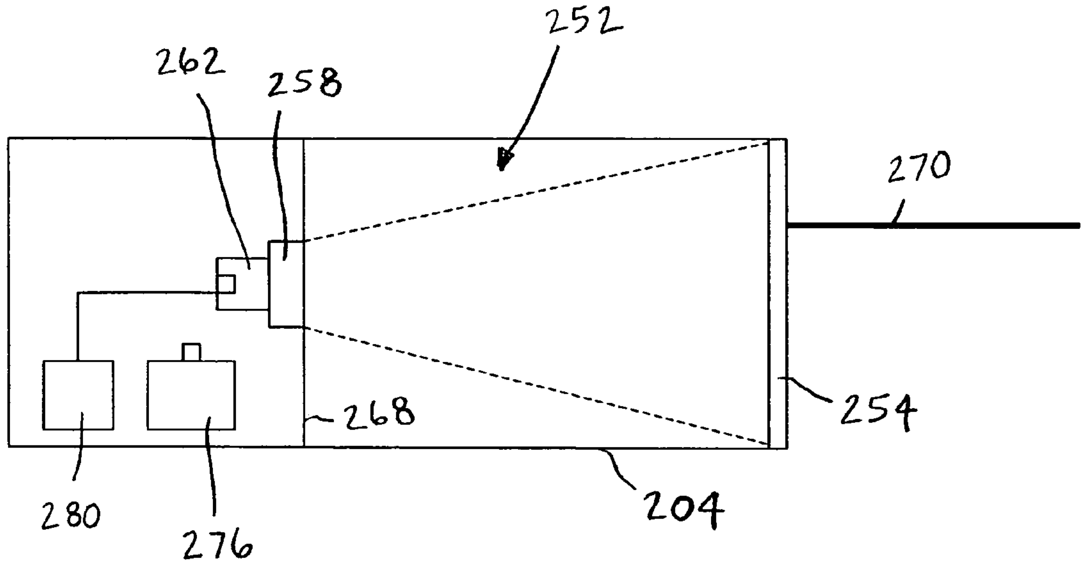
FIG. 14 s a schematic view of an image acquisition device of the survey car of FIG. 5.

An image acquisition device 252 is positioned inside the housing 204. The embodiment of the image acquisition device 252 that is schematically illustrated in FIG. 14 includes a screen 254, a filter 258, and an image capturing device 262. The screen 254 is positioned on an end of the housing 204 and serves to reduce the amount of ambient light entering the housing 204. The screen 254 may be made of any suitable material (e.g., glass, plastic, polycarbonate, and the like) and may include a coating (e.g., a frosted coating) to reduce the reflection of the laser light. In other embodiments, the screen 254 may be formed of a fiber optic faceplate or taper. The filter 258 and the image capturing device 262 are spaced from the screen and positioned adjacent a wall 268 that blocks light from interfering with the image acquisition device 252. In the illustrated embodiment, the wall 268 is spaced from the screen 254 by a distance that is substantially equal to a focal length of the image capturing device 262. In one embodiment, the filter 258 may be formed of a material that acts as a narrow bandpass filter nominally centered at the wavelength of the laser 108 (e.g., 630 nm). The image capturing device 262 may include a CCD camera having a CCD chip and a lens. In one embodiment, the CCD camera is manufactured by UNIQ and includes a 0.5 inch standard RS 170 chip. In other embodiments, the image capturing device 262 may be alternatively configured. The illustrated image capturing device 262 includes a resolution of 640 pixels by 480 pixels, however, the resolution may be higher or lower in other embodiments. A power supply 276 (FIGS. 9 and 14) positioned in the housing 204 provides power to the image acquisition device 252. A switch configured to interrupt the provision of power may be actuated remotely (e.g., from the remote computer 300) or locally.

Figure 15:
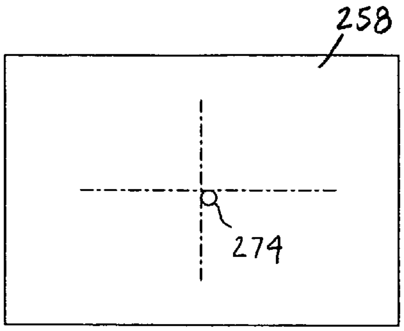
FIGS. 15-18 are schematic views of a screen of the image acquisition device of FIG. 14 having a laser spot projected thereon.
Figure 16:
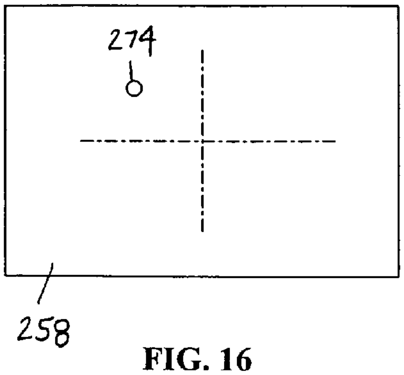
Figure 17:
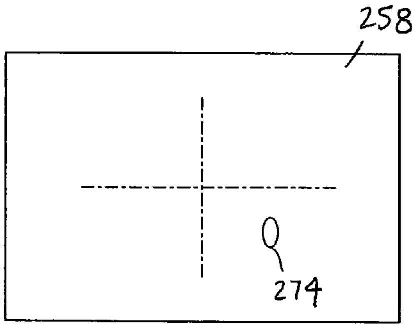
Figure 18:
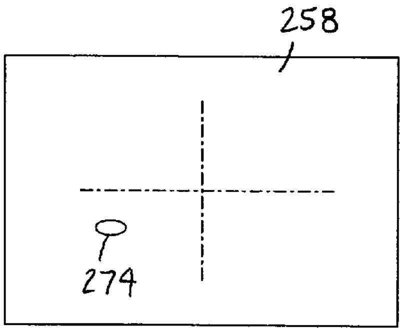

With reference to FIGS. 15-17, the laser 108 emits a laser beam 270 (FIG. 14) that project a laser spot 274 on the screen 254. Images of the screen 254 that include corresponding images of the laser spot 274 are obtained using the image capturing device 262. The image capturing device 262 receives the signal from the encoder 240 and utilizes the signal to trigger acquisition of an image when a predetermined number of pulses or counts are reached. When acquisition is triggered, a shutter of the image capturing device 262 is actuated to photograph the screen 254. The light entering the image capturing device 262 is filtered by the filter 258. In the illustrated embodiment, the filtered light passes through the camera lens and is projected onto the CCD chip. The image appears as an area comprised of pixels on the CCD chip. The digital information (i.e., the image) is transmitted to the remote computer 300 (FIG. 1). Data representative of the encoder signal is also transmitted to the remote computer 300.

The illustrated remote computer 300 includes a video capture device (e.g., an Imperx Inc. model number VCE-B5A01 video capture card) that captures the transmitted images. In one embodiment, a transition (e.g., a black to white transition) signals the video capture device to record an image. The remote computer 300 may communicate with the survey car 74 and/or the laser assembly 70 using a suitable communication scheme. In the illustrated embodiment, an RF transceiver 280 (FIGS. 9 and 14) is positioned in the housing to communicate with the remote computer 300. In other embodiments, a direct cable video feed may be utilized. The images are saved in a memory of the remote computer 300 for later processing. The illustrated remote computer 300 is a laptop utilized by a surveyor while positioned at a safe location in the structure that includes the rail system (e.g., on the floor). The remote computer 300 may include any commercially available processor, memory, display, user inputs, and the like.

For operation, the laser assembly 70 is mounted at a first position on the first rail 26 (e.g., an end of the first rail 26). When an overhead crane is positioned on the rail system, the crane may be moved to one end of the rail system to allow uninterrupted performance of the runway survey. The laser assembly 70 is mounted on the first rail 26 by moving the mounting structure 80 from the open position toward the closed position until the L-shaped portions of the brackets 92 engage respective upper surfaces of the lower flange of the rail 26. The nuts 100 are then moved inwardly on the threaded rod member 96 to prevent the mounting structure 80 from moving toward the open position, thus preventing the laser assembly 70 from falling off the first rail 26.

The laser 108 is aligned with the center of the rail 26 at a second position on the rail (e.g., an opposite end of the first rail 26) by rotating the bracket 116 relative to the housing 84 until a laser beam emitted by the laser 108 projects a laser spot on a temporary target (e.g., a steel plate) positioned at the second position. Such alignment of the laser 108 ensures the laser beam will be projected onto the screen 254 the entire length of the rail 26. Once aligned, the bracket 116 may be locked relative to the housing 84 to prevent inadvertent movement. The laser 108 can perform a self-leveling routine if the laser 108 is in an out-of-level position.

The survey car 74 is then supported on the first rail 26 for movement relative to the laser 108. The survey car 74 is mounted on the first rail 26 by moving the mounting structure 200 from the open position toward the closed position until the drive wheels 124 and idler wheels 132 engage respective upper surfaces of the lower flange of the rail 26. The nuts 216 are then moved inwardly on the threaded rod member 212 to prevent the mounting structure 200 from moving toward the open position, thus preventing the survey car 74 from falling off the first rail 26. In one embodiment, the survey car 74 is positioned so the screen 108 is directly adjacent the emitting end of the laser 108. In the illustrated embodiment, the screen 254 is placed directly adjacent the laser 108 by inserting the housing 204 of the survey car 74 inside the housing 84 of the laser assembly 70.

The laser is turned ON (if not already ON from the alignment process) and a laser spot 274 is projected on the screen 254. An initial image of the screen 254 is taken using the image capturing device 262. The initial image is transmitted to the remote computer 300 and utilized to determine the datum point for first rail 26 (i.e., the point all other points on the first rail 26 are compared with). After the initial image is obtained, the motors 232 are turned on to propel the survey car 74 down the first rail 26. In the illustrated embodiment, the motors 232 are controlled remotely from the remote computer 300. In other embodiments, the motors 232 may be alternatively controlled. The encoder 240 turns as the survey car 74 moves longitudinally down the first rail 26, generating a signal indicative of the distance traveled by the survey car 74. The image capturing device 262 utilizes the encoder signal to trigger acquisition of an image at predetermined Z-positions. In one embodiment, the predetermined Z-positions are spaced every five feet. In other embodiments, the predetermined Z-positions are spaced more or less.

A plurality of images are acquired as the survey car 74 moves away from the laser 108, passing each predetermined Z-position. Each image of the screen 254 includes an image of the laser spot 274 projected on the screen 254. Each image is transmitted to the remote computer 300 and saved in memory associated with the remote computer 300 for processing.

As the survey car 74 reaches the second position, the motors 232 are turned OFF to stop the survey car 74. The same process utilized to survey the first rail 26 is repeated on the second rail 28. Three additional measurements are taken to compare the first and second rails 26 and 28. The first measurement is obtained while the laser assembly 70 is still mounted on the first rail 26. The housing 84 is rotated to the perpendicular position so the laser beam emitted by the laser 108 projects a laser spot on a target positioned on the first position of the second rail 28. The laser spot is utilized to obtain a measurement of the difference in elevation between the corresponding first positions of the first and second rails 26 and 28. This information is utilized to correlate the datum point of the first rail 26 to the datum point of the second rail 28. The second measurement is a distance measurement between corresponding first positions of the first and second rails 26 and 28. The third measurement is a distance measurement between corresponding second positions of the first and second rails 26 and 28. The second and third measurements can be obtained using a distometer (e.g., a pulsing laser and a steel target). Distances should be measured from the center of the first rail 26 to the center of the second rail 28, or an edge of the first rail 26 to an edge of the second rail 28. The second and third measurements are utilized to ensure the first and second rails 26 and 28 are generally parallel.

The illustrated laser 108 is capable of projecting a usable laser spot 274 on the screen 254 at a distance of up to 1000 feet. Although many rail systems are under 1000 feet in length, some surveys are performed on rail systems having a length of over 1000 feet. For such surveys, a laser capable or projecting a laser spot on the screen at a distance greater than the laser 108 may be utilized, or the laser assembly 70 may be moved from the first position on the first rail 26 to the second position on the first rail 26 and a similar surveying process completed. Regardless of the number of times the laser assembly 70 is moved, each data point can be correlated to the datum point obtained from the initial image of the screen 254. Such correlation reduces the introduction of human error into the survey results. Although the survey device 10 is described with respect to a two rail runway, the survey device 10 can be utilized to perform surveys on rail systems having any number of rails and rails of any length. In other embodiments, the processes of the survey may be altered.

Upon completion of all dimension taking, the remote computer 300 executes software that runs an analysis of the data. First, the images are digitized and the laser spot assigned a point having an X dimension and a Y dimension with respects to a X=0, Y=0 location on the image. The X and Y dimensions are converted from pixels to standard units of measurement (e.g., inches, centimeters). The X and Y dimensions are then stored in the computer with a corresponding Z dimension. The Z dimension is derived from the encoder signal that controls the shutter of the image capturing device 262. Each point is compared with the datum point and deviation in the X dimension and the deviation in the Y direction calculated. The deviations are then compared to standards to determine if adjustment of the rails 26 and 28 is necessary.

In one embodiment, the software performs a centroidal analysis of the image to determine the center of the laser spot 274. As illustrated in FIGS. 15-17, the laser spot 274 is not always circular. The laser spot 274 can become generally elliptical when the portion of the rail 26, 28 supporting the survey car 74 is skew relative to the portion of the rail 26, 28 supporting the laser assembly 74. In one embodiment, the centroidal analysis is performed using Spotfinder software provided by Axon Instruments of Union City, Calif. In another embodiment, the centroidal analysis is performed using sub-pixel interpolation. In yet other embodiments, the X and Y dimensions of the laser spot 274 may be obtained using other mathematical operations. Determination of the exact center of the laser spot 274 provides enhanced results.

In some embodiments, the software program runs a complete analysis of the first and second rails 26 and 28 to determine whether the rail alignment meets standards (e.g., standards developed by CMAA). In some embodiments, the data points may be graphically displayed (e.g., displayed as a 3-D representation using, for example, a .dxf file) so the surveyor can easily visualize the deviation of each rail. In some embodiments, the measured rails may be displayed relative to a straight rail to enhance visualization.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A laser survey device for performing a runway survey on a rail system, the rail system utilized to support a device such as an overhead crane, the laser survey device comprising:

a laser unit mounted on a rail of the rail system, the laser unit including a laser; and a self-propelled survey car supported on the rail for movement relative to the laser, the survey car including a mounting structure movable between a first position in which the mounting structure is positionable proximate the rail and a second position in which the mounting structure engages the rail to mount the survey car to the rail, the survey car also including a drive mechanism to move the survey car along the rail relative to the laser, and an image acquisition device, wherein the laser emits a laser beam that projects a laser spot on the image acquisition device and the image acquisition device captures an image of the laser spot.

2. The laser survey device according to claim 1, wherein the drive mechanism includes at least one drive wheel supported on the rail of the rail system.

3. The laser survey device according to claim 1, wherein the image acquisition device includes a screen and an image capturing device positioned to obtain an image of the screen, and wherein the image capturing device captures an image of the screen that includes an image of the laser spot.

4. The laser survey device according to claim 3, wherein the image acquisition device includes a filter positioned adjacent the image capturing device and between the image capturing device and the screen.

5. The laser survey device according to claim 3, wherein the image capturing device is spaced from the screen by a distance substantially equal to a focal length of the image capturing device.

6. The laser survey device according to claim 3, wherein the image capturing device is a CCD camera.

7. The laser survey device according to claim 1, wherein the self-propelled survey car includes an encoder connected to a shaft, wherein movement of the shaft is representative of movement of the survey car relative to the laser, and wherein the encoder triggers acquisition of the image of the laser screen by the image acquisition device.

8. The laser survey device according to claim 1, wherein the survey car includes a first biasing assembly contacting a first side portion of the rail and a second biasing assembly contacting a second side portion of the rail to center the survey car on the rail.

9. The laser survey device according to claim 8, wherein the first and second biasing assemblies each include a guide roller biased toward the corresponding side portion of the rail by a spring.

10. The laser survey device according to claim 1, wherein the survey car is a top-running survey car.

11. The laser survey device according to claim 1, wherein the survey car is a bottom-running survey car.

12. The laser survey device according to claim 1, wherein the mounting structure includes a pair of brackets generally aligned to each other and spaced apart wherein the brackets are movable relative to each other between the first position and the second position.

13. The laser survey device according to claim 12, wherein a scissors arrangement extends between the brackets to facilitate movement of the mounting structure between the first and second positions.

14. The laser survey device according to claim 12, wherein the drive mechanism is coupled to at least one of the brackets of the mounting structure.

15. The laser survey device according to claim 1, further comprising a computer for analyzing the captured images to determine positioning of the rail.

* * * * *